United States Patent
Simison

[11] Patent Number: 6,151,840
[45] Date of Patent: Nov. 28, 2000

[54] TELESCOPE ENCLOSURE

[76] Inventor: Eric Simison, 1977 Golden Hills Rd., La Verne, Calif. 91750

[21] Appl. No.: 09/310,186

[22] Filed: May 12, 1999

[51] Int. Cl.[7] .............................. E04B 1/343; E04B 12/18
[52] U.S. Cl. .................................. 52/67; 52/72; 52/79.4; 52/123.1; 52/247; 52/741.3; 52/745.01; 52/745.02
[58] Field of Search .................................. 52/18, 67, 72, 52/79.4, 123.1, 247, 741.3, 745.01, 745.02

[56] References Cited

U.S. PATENT DOCUMENTS

| | | | |
|---|---|---|---|
| 2,563,886 | 8/1951 | Taylor | 52/67 X |
| 2,635,302 | 4/1953 | Denning | 52/67 X |
| 5,168,675 | 12/1992 | Shea, Sr. | 52/67 X |
| 5,848,507 | 12/1998 | Bozich | 52/67 X |

*Primary Examiner*—Christopher T. Kent
*Attorney, Agent, or Firm*—Sheldon & Mak; Denton L. Anderson

[57] ABSTRACT

An enclosed structure for housing large telescopes and other scientific equipment. The enclosed structure includes a circular base and a dome-shaped cover. The sides of the structure are provided by overlapping cylindrical sections which are vertically movable in telescope fashion with respect to one another. The cylindrical sections are supported by vertical posts disposed around the perimeter of the structure and can be vertically displaced by electric motors operating drive shafts disposed within the vertical posts.

20 Claims, 5 Drawing Sheets

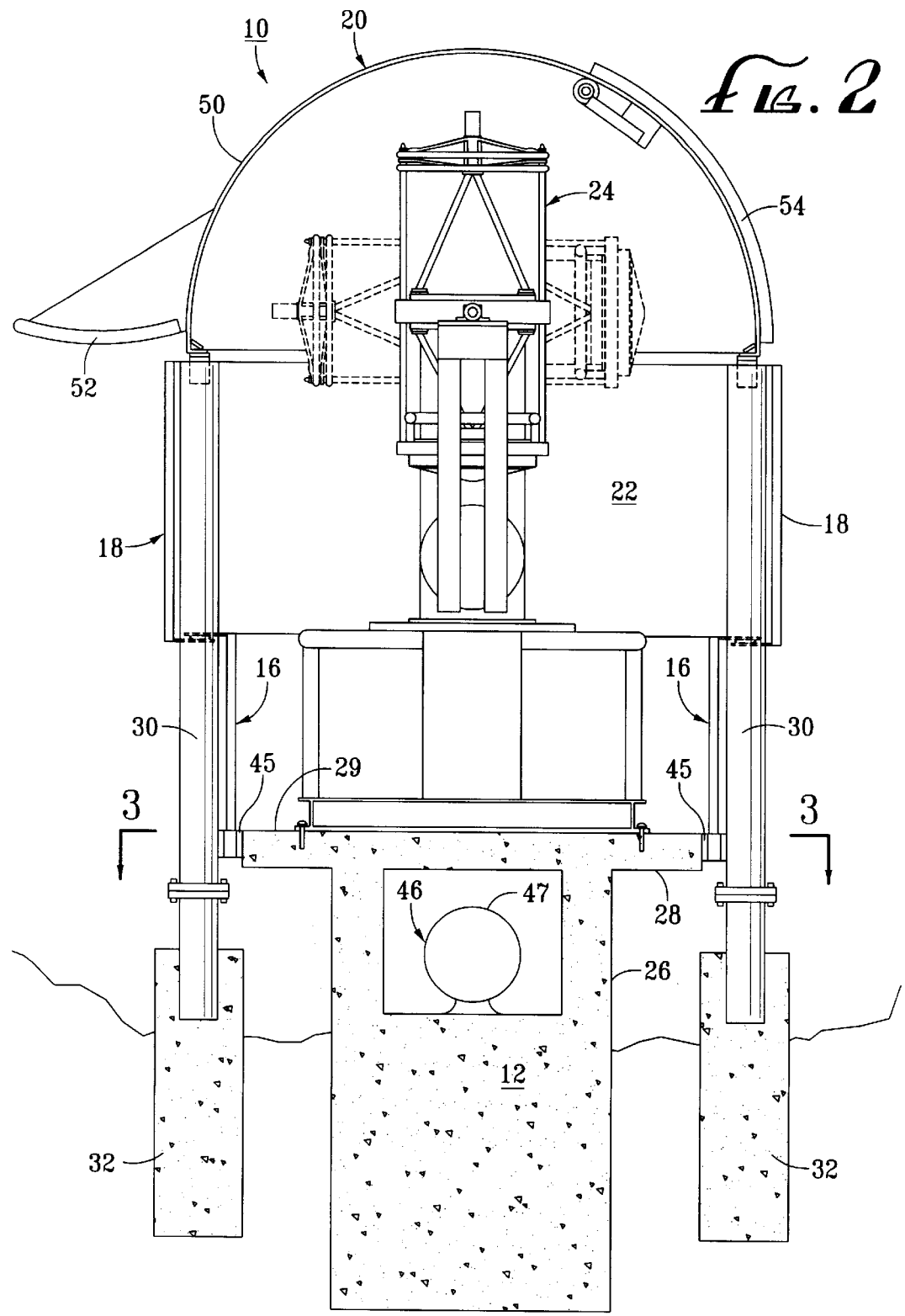

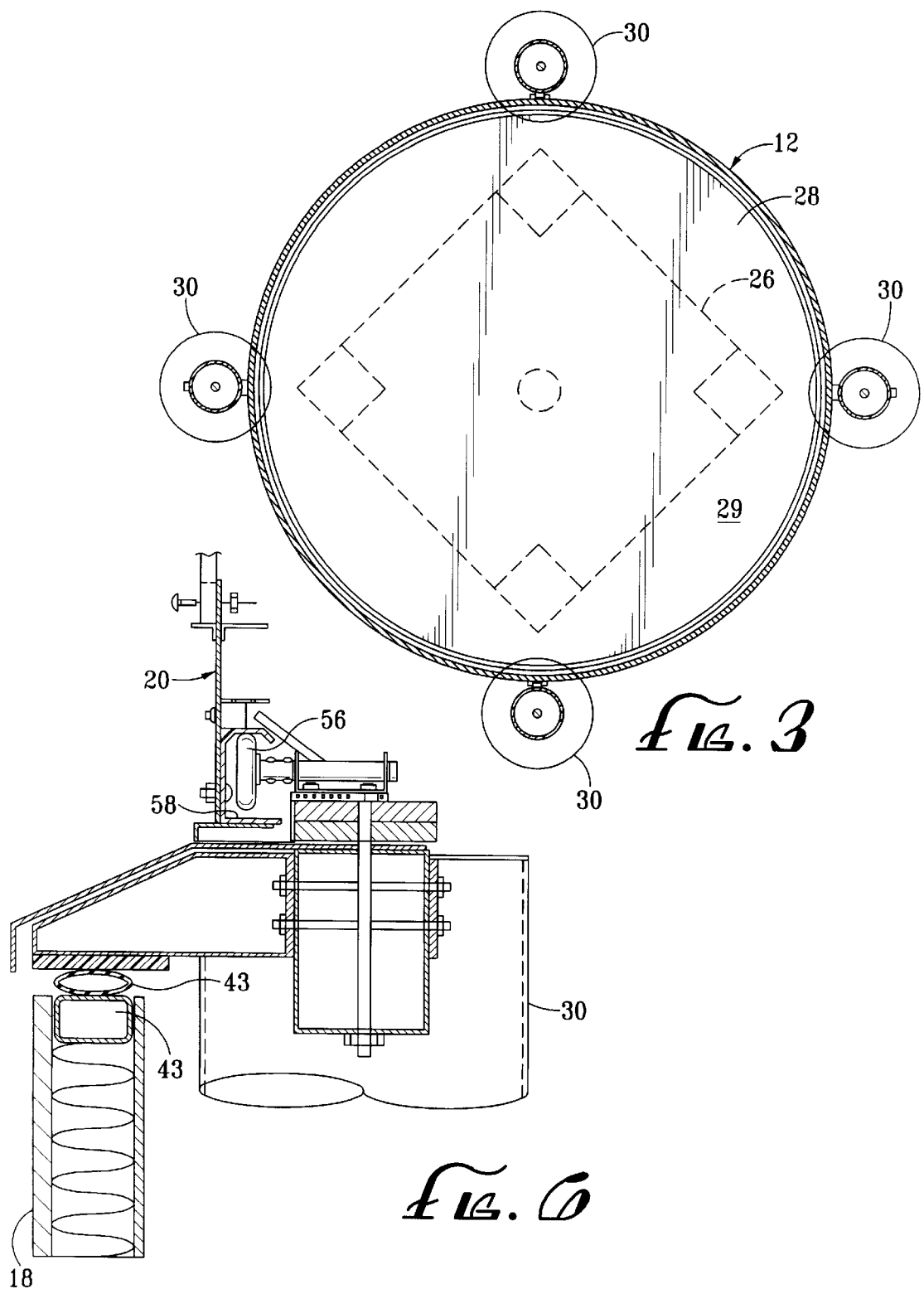

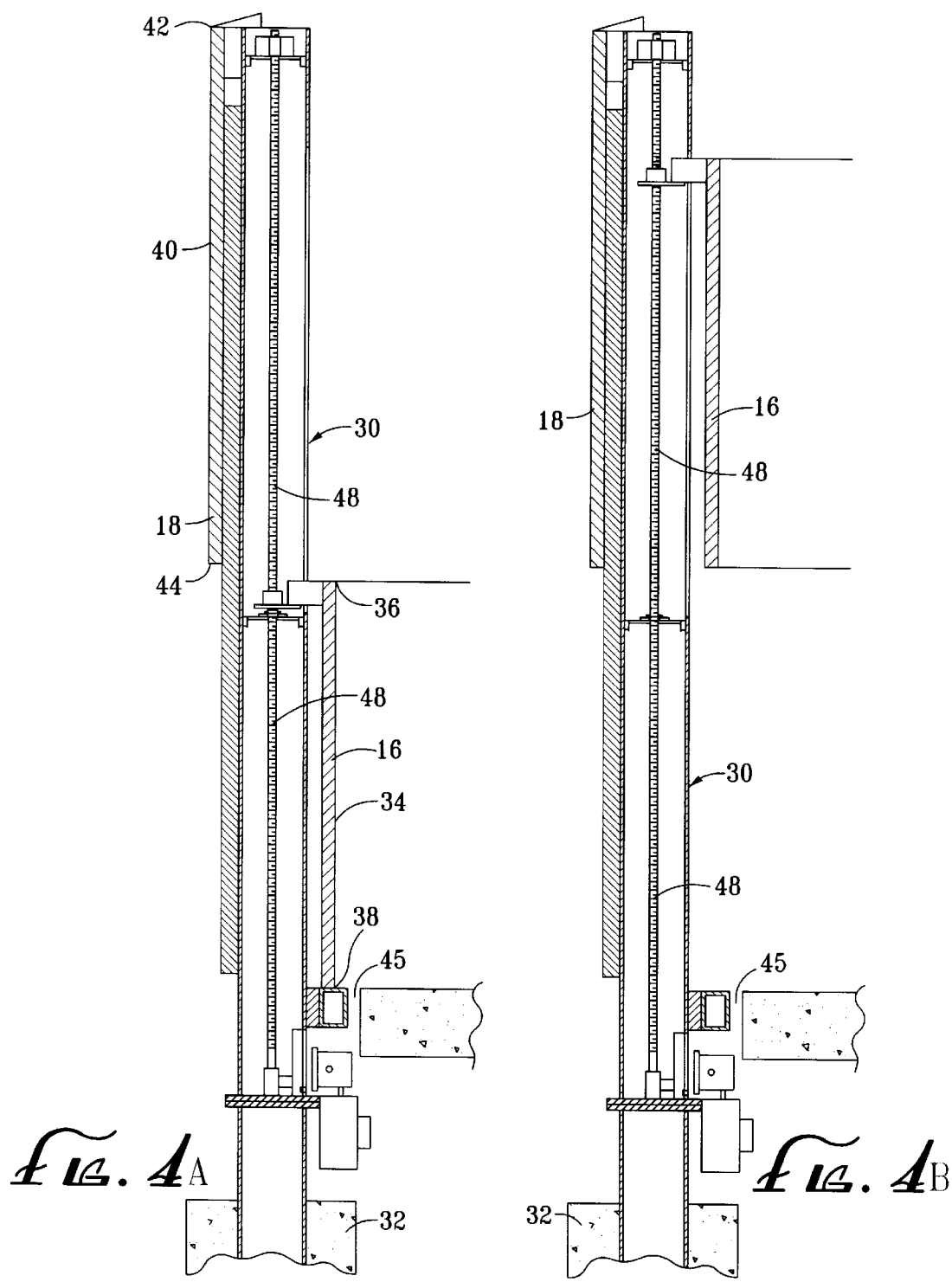

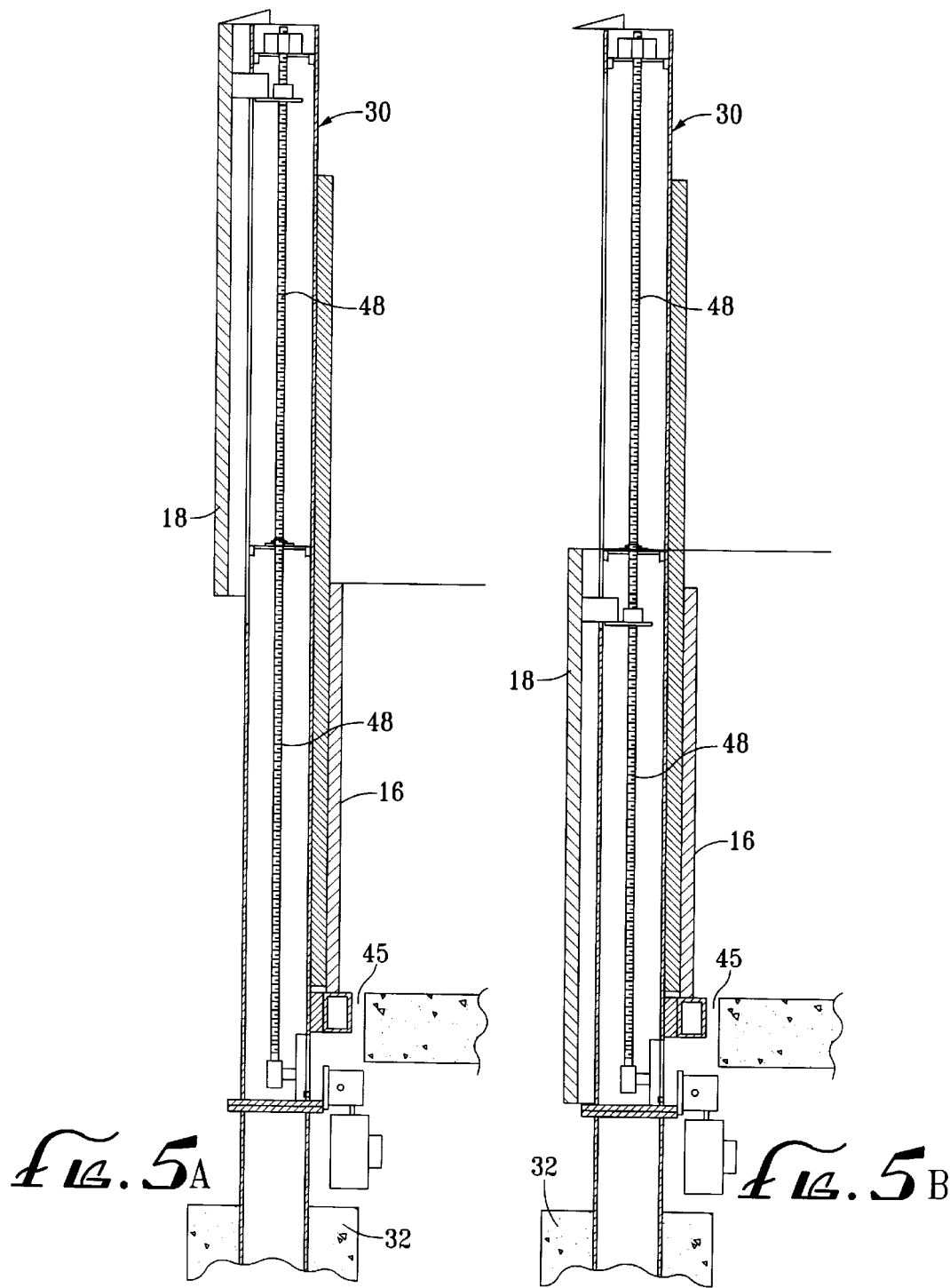

TELESCOPE ENCLOSURE

FIELD OF THE INVENTION

This invention relates generally to enclosed structures and, more specifically, to enclosed structures used to house telescopes and similar equipment.

BACKGROUND OF THE INVENTION

Enclosed structures used to house large telescopes and other highly technical equipment must meet many criteria. First and foremost, the structures must safely enclose the equipment and protect the equipment from the elements. Since such equipment is frequently located on mountain tops or in deserts, protecting the equipment from meteorological extremes is generally important. Also important in many locations is protecting the equipment from the effects of earthquakes.

Frequently, such structures must also be capable of controlling the atmosphere within the interior of the structure to very close tolerances. This is especially true when the equipment is a large visible light telescope. Where the structures are to enclose such a telescope, the temperature of the air surrounding the telescope components must generally be substantially uniform, frequently within tolerances of about 0.25–0.5° F. Non-uniform temperatures tend to misalign the telescope components, thereby reducing the clarity of images viewed through the telescope. Moreover, the flow of ventilating air within the structures must generally be kept laminar. Turbulent eddies of air within the structure can also decrease the clarity of images viewed through the telescope.

Another criteria of such enclosed structures is that physical access to the interior of the structures must be well-protected. Such enclosed structures are frequently located in remote areas where they are vulnerable to burglary and vandalism.

As a result of these many criteria, the construction, maintenance and operation of enclosed structures housing telescopes and similar equipment has traditionally been very expensive.

Accordingly, there is a need for an enclosed structure for housing telescopes and similar equipment which is simpler and less expensive to construct, maintain and operate, while meeting the many criteria for such structures.

SUMMARY

The invention satisfies this need. The invention is a combination comprising (a) a base, (b) a support structure, (c) a first cylindrical section having side walls and upper and lower open ends, the first cylindrical section being vertically movable between a lowermost first cylindrical section position and an uppermost first cylindrical section position, (d) a second cylindrical section having side walls and upper and lower open ends, the second cylindrical section being vertically movable between a lowermost second cylindrical section position and an uppermost second cylindrical section position, the second cylindrical section being disposed in telescope-like relationship with the first cylindrical section, (e) a cover disposed directly above the upper open ends of the first and second cylindrical sections, (f) a driver for moving the first cylindrical section between the lowermost and uppermost first cylindrical section positions and for moving the second cylindrical section between the lowermost and uppermost second cylindrical section positions, wherein, when the first cylindrical section is disposed at the lowermost first cylindrical section position and the second cylindrical section is disposed at the uppermost second cylindrical section position, the base, the first cylindrical section, the second cylindrical section and the cover define an enclosed chamber.

In a typical embodiment, the driver comprises a motor and one or more drive shafts.

In a preferred embodiment of the invention, the support structure comprises a plurality of vertical posts. In such embodiments, the drive shafts are typically disposed within the posts.

Both the first and second cylinders are independently movable to efficiently and conveniently allow access to the enclosed chamber and to provide laminar flow of ambient ventilation air.

DRAWINGS

These features, aspects and advantages of the present invention will become better understood with regard to the following description, appended claims and accompanying figures where:

FIG. 2 is a cross-sectional side view of the combination illustrated in FIG. 1 taken along line 2—2;

FIG. 3 is a cross-sectional plan view of the combination illustration in FIG. 2 taken along line 3—3;

FIG. 4A is a cross-sectional side view of a support structure useable in the invention, showing the first cylindrical section in the lowermost first cylindrical section position;

FIG. 4B is a cross-sectional side view of a support structure useable in the invention, showing the first cylindrical section in the uppermost first cylindrical section position;

FIG. 5A is a cross-sectional side view of a support structure useable in the invention, showing the second cylindrical section in the uppermost second cylindrical section position;

FIG. 5B is a cross-sectional side view of a support structure useable in the invention, showing the second cylindrical section in the lowermost second cylindrical section position; and FIG. 6 is a cross-sectional side detail view of the interface between the upper portion of the side walls and the cover of the embodiments illustrated in FIGS. 1–5.

DETAILED DESCRIPTION

Figure 1:
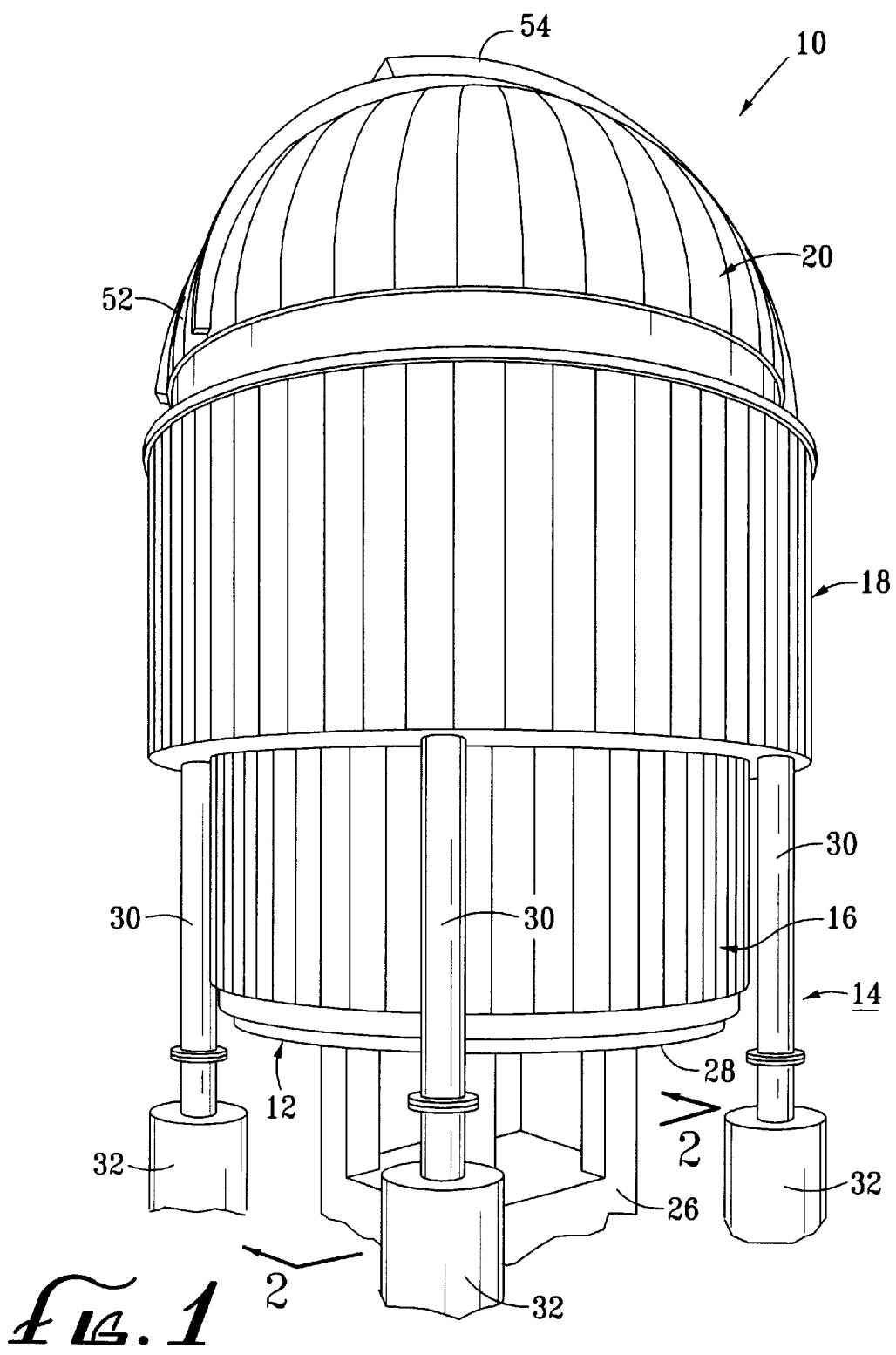
FIG. 1 is a perspective view of a combination having features of the invention.

The following discussion describes in detail one embodiment of the invention and several variations of that embodiment. This discussion should not be construed, however, as limiting the invention to those particular embodiments. Practitioners skilled in the art will recognize numerous other embodiments as well.

The invention is a combination 10 comprising a base 12, support structure 14, a first cylindrical section 16, a second cylindrical section 18 and a cover 20. The base 12, the first cylindrical section 16, the second cylindrical section 18 and the cover 20 cooperate to define an enclosed chamber 22.

The base 12 is typically a concrete pedestal anchored within the earth. This pedestal forms the floor of the enclosed chamber 22 upon which a telescope 24 or similar equipment can be affixed. In the embodiment of the invention illustrated in the drawings, the base 12 has a lower portion 26 and an upper portion 28. The lower portion 26 is largely disposed underground, and can be conveniently formed in a square or rectangle. The upper portion 28 is disposed atop the lower portion, such that its upper surface 29 is elevated several feet above the ground. In a preferred embodiment of the invention, the upper portion 28 is generally circular (when viewed from above), to cooperate with circular-shaped first and second cylindrical sections 16 and 18.

The support structure 14 provides support for the first and second cylindrical sections 16 and 18 and for the cover 20. In the preferred embodiment illustrated in the drawings, the support structure 14 comprises a plurality of vertical posts 30 disposed around the perimeter of the base 12. As illustrated in the embodiment shown in the drawings, the posts 30 can be hollow to accommodate driver components for vertically articulating the first and second cylindrical sections 16 and 18 (as described in greater detail below).

Supporting the first and second cylindrical sections 16 and 18 and the cover on vertical posts 30 has several advantages. First of all, this reduces "ground effect" turbulence in the air flowing around the outside of the cover 20. "Ground effect" turbulence is caused by air currents rising up the sides of a structure where the side walls extend all the way to the ground. Secondly, use of a support structure 14 which comprises individual vertical posts 30, minimizes the volume of the base 12. This has the beneficial effect of reducing heat gain from the earth into the enclosed chamber 22 because the amount of heat which is conducted into the enclosure 22 via the base 12 is reduced (due to the reduced size of the base 12).

Preferably, each vertical post 30 is supported in a small diameter independent footing 32. This embodiment minimizes problems due to erosion and facilitates the installation of the invention 10 on uneven and sloped terrains.

The first and second cylindrical sections 16 and 18 are preferably substantially circular as illustrated in the drawings. The natural curvature of circular side walls naturally tends to form a more laminar flow compared to side walls having one or more vertical corner seams. In a typical embodiment of the invention 10 housing a remotely-disposed telescope 24, the inside diameter of both the first and second cylindrical sections 16 and 18 are between about 12 feet and about 18 feet.

The first cylindrical section 16 has sidewalls 34, an upper open end 36 and a lower open end 38. The first cylindrical section 16 is movable between a lowermost first cylindrical section position (as illustrated in FIG. 4A) and an uppermost cylindrical first cylindrical section position (as illustrated in FIG. 4B).

The second cylindrical section 18 has sidewalls 40, an upper open end 42 and a lower open end 44. The second cylindrical section 18 is movable between a lowermost section cylindrical section position (as illustrated in FIG. 5A) and an uppermost cylindrical section cylindrical section position (as illustrated in FIG. 5B).

It is important in the invention 10 that one of the two cylindrical sections 16 or 18 has an inside diameter which is larger than the outside diameter of the other cylindrical section 16 or 18, so that the two cylindrical sections 16 or 18 can move vertically in telescoping fashion with respect to one another. In the embodiment illustrated in the drawings, the second cylindrical section 18 is the larger of the two cylindrical sections, having an inside diameter which is larger than the outside diameter of the first cylindrical section 16.

The invention 16 is not limited to embodiments having only two cylindrical sections 16 or 18. Additional sections, movable or fixed, can also be used in the invention 10.

Use of a second cylindrical section 18 which is capable of being articulated to a lowermost position substantially below an uppermost position allows convenient lateral access to the telescope 24 or other scientific equipment within the enclosed chamber 22 to facilitate maintenance on the telescope 24 or other scientific equipment.

As illustrated in FIG. 6, the perimeters of the cylindrical sections 16 and 18 can comprise one or more resilient "stops" 43 which cushion contact with the base 12 or with the cover 20 and which seal the perimeter of each cylindrical section 16 and 18.

Preferably, the invention 10 further comprises an isolation gap 45 disposed between the base 12 and steel framing rings (not shown) which support the cylindrical sections 16 and 18. Such construction minimizes thermal and vibration transfer to the telescope 24 or other item of scientific equipment disposed within the enclosed structure 22.

The invention 10 further comprises a driver 46 for moving the first cylindrical section 16 between the lowermost and uppermost first cylindrical positions and for moving the second cylindrical section 18 between the lowermost and uppermost cylindrical section positions. Preferably, the driver 46 can also move both the first and second cylindrical sections 16 and 18 to an infinite number of intermediate first and second cylindrical section positions between the uppermost and lowermost positions. The driver 46 can comprise one or more electric motors 47 operatively connected to one or more drive shafts 48. The driver 46 is preferably a servo-electric motor. Alternatively, the driver 46 can comprise hydraulic pistons (not shown). In embodiments of the invention wherein the support structure 14 comprises a plurality of hollow vertical posts 30, drive shafts 48 used in the driver 46 can be conveniently disposed within one or more of the vertical posts 30.

The cover 20 can be any appropriate structure for enclosing the uppermost portion of the enclosed structure 22. One of the advantages of the invention 10 is that it can accommodate most of the standard dome-shaped telescope covers presently available on the market. In the embodiment illustrated in the drawings, the cover 20 is a hemispherical, dome-shaped cover, having an elongate window 50 through which a telescope 24 within the enclosed structure 22 can be focused on the cosmos. In the embodiment illustrated in the drawings, the elongate window 50 is closeable by a drop down shutter 52 and by a slidable shutter 54.

The cover 20 is typically mounted on rollers 56 set into a roller track 58 to allow the cover 20 to rotate 360°.

In a preferred embodiment, the combination 10 has no windows or doors per se, therefore minimizing vulnerability to burglary and/or vandalism. In such embodiments, physical access from the ground to the enclosed chamber 22 can be limited to only the access opening created by raising the first cylindrical section 16 to an elevation above the lowermost first cylindrical section position. This feature virtually eliminates the danger of the enclosed chamber 22 being breached by burglars or vandals.

The invention can also comprise refrigeration or other active ventilation systems (not shown) capable of supplementing the natural flow of ventilation air as induced by the opening of the first and/or second cylindrical sections 16 and 18.

In preferred embodiments, the combination 10 further comprises a controller (not shown) which can control the opening and closing of the first and second cylindrical sections 16 and 18. This allows for the convenient control of the atmosphere within the enclosed structure 22 by technicians located remotely from the installation site of the combination 10.

The combination can easily be assembled and disassembled in "bolt together" fashion, so as to allow easy assembly and disassembly of the combination.

The invention can conveniently comprise a telescope 24 disposed on the base 12 within the enclosed chamber 22. The invention is also adaptable for use in housing a radar antenna, laser or other equipment disposed within the enclosed chamber 22. The height and diameter of the invention can be easily varied to meet the intended use and/or the equipment to be housed within the enclosed chamber 22.

EXAMPLE

In a typical embodiment of the invention, the base 12 comprises a square lower portion 26 having sides of 8 ft., 0 inches. The depth of the lower section is 6 feet. Atop the lower section 20 of the base 12 which is a circular upper portion 28 having a diameter of 13 feet.

The first cylindrical section 16 is circular with an in side diameter of 13½ feet and a height of 6 feet. The second cylindrical section is also circular having an inside diameter of 17 feet and a height of 8 feet. The cover is hemispherical with a radius of 8½ feet.

The supporting structure 14 comprises four vertical posts 30, each being 12 inches in diameter. Each post is anchored in foundation piers 32 having a square section, 2.5 foot on each side. The depth of each foundation pier 32 is 10 feet.

Both the first cylindrical section 16 and the second cylindrical section 18 are vertically movable using twin acme screw trains. The power plant for each drive train is a servo motor system 47 mounted directly beneath the upper portion 28 of the base 12. The servo motors 47 are linked to left and right rotating drive shafts 48 via a twin output, reduction, right angled gear box (not shown). The drive shafts 48 enter opposed columns 30 and are linked to the vertical drive screws 48 through a direct drive gear box (not shown). The acme screw 48 is supported by a bearing block (not shown) at the top of the post 30 and is held in alignment with an intermediate bearing and the lower end coupling to the drive shaft gear box. Each acme screw 48 is 1.25 inches in diameter and can move each cylindrical section 16 and 18 at the rate of about 8–9 inches per minute. The power plant 47 is housed in a removable sheet metal shroud and the acme screw assembly 48 is housed within the vertical posts 30. Extraction of the acme screw assembly is possible through the removal of a plate at the top of the post. Both the first and second cylindrical sections 16 and 18 can be opened to an infinite number of positions between each lowermost cylindrical section position and each uppermost cylindrical section position.

Having thus described the invention, it should be apparent that numerous structural modifications and adaptations may be resorted to without departing from the scope and fair meaning of the instant invention as set forth hereinabove and as described hereinbelow by the claims.

What is claimed is:

1. A combination comprising:

(a) a base;

(b) a support structure;

(c) a first cylindrical section having side walls and upper and lower open ends, the first cylindrical section being vertically movable between a lowermost first cylindrical section position and an uppermost first cylindrical section position;

(d) a second cylindrical section having side walls and upper and lower open ends, the second cylindrical section being vertically movable between a lowermost second cylindrical section position and an uppermost second cylindrical section position, the second cylindrical section being disposed in telescope-like relationship with the first cylindrical section;

(e) a cover disposed directly above the upper open ends of the first and second cylindrical sections;

(f) a driver for moving the first cylindrical section between the lowermost and uppermost first cylindrical section positions and for moving the second cylindrical section between the lowermost and uppermost second cylindrical section positions;

wherein, when the first cylindrical section is disposed at the lowermost first cylindrical section position and the second cylindrical section is disposed at the uppermost second cylindrical section position, the base, the first cylindrical section, the second cylindrical section and the cover define an enclosed chamber.

2. The combination of claim 1 wherein the first cylindrical section and the second cylindrical section are substantially circular.

3. The combination of claim 2 wherein the outside diameter of the first cylindrical section and the second cylindrical section are both between about 6 feet and about 30 feet.

4. The combination of claim 2 wherein the second cylindrical section has an inside diameter which is larger than the outside diameter of the first cylindrical section.

5. The combination of claim 1 wherein the driver comprises a motor and at least one drive shaft.

6. The combination of claim 5 wherein the support structure comprises a plurality of vertical posts and wherein the at least one drive shaft is disposed within the posts.

7. The combination of claim 1 wherein the sole access from the ground to the enclosed chamber is provided by the opening created by raising the first cylindrical section to an elevation above the lowermost first cylindrical section position.

8. The combination of claim 1 further comprising a telescope within the enclosed chamber.

9. The combination of claim 1 further comprising a radar antenna within the enclosed chamber.

10. The combination of claim 1 further comprising a laser within the enclosed chamber.

11. A combination comprising:

(a) a base;

(b) a support structure comprising a plurality of vertical posts;

(c) a first substantially circular cylindrical section having side walls and upper and lower open ends, the first cylindrical section being vertically movable between a lowermost first cylindrical section position and an uppermost first cylindrical section position;

(d) a second substantially circular cylindrical section having side walls and upper and lower open ends, the second cylindrical section being vertically movable between a lowermost second cylindrical section position and an uppermost second cylindrical section position, the second cylindrical section being disposed in telescope-like relationship with the first cylindrical section;

(e) a cover disposed directly above the upper open ends of the first and second cylindrical sections;

(f) a driver for moving the first cylindrical section between the lowermost and uppermost first cylindrical section positions and for moving the second cylindrical section between the lowermost and uppermost second cylindrical section positions;

wherein, when the first cylindrical section is disposed at the lowermost first cylindrical section position and the second cylindrical section is disposed at the uppermost second cylindrical section position, the base, the first cylindrical section, the second cylindrical section and the cover define an enclosed chamber.

12. The combination of claim 11 wherein the outside diameter of the first cylindrical section and the second cylindrical section are both between about 6 feet and about 30 feet.

13. The combination of claim 11 wherein the second cylindrical section has an inside diameter which is larger than the outside diameter of the first cylindrical section.

14. The combination of claim 11 wherein the driver comprises a motor and at least one drive shaft.

15. The combination of claim 14 wherein the at least one drive shaft is disposed within the posts.

16. The combination of claim 11 wherein the sole access from the ground to the enclosed chamber is provided by the opening created by raising the first cylindrical section to an elevation above the lowermost first cylindrical section position.

17. The combination of claim 11 further comprising a telescope within the enclosed chamber.

18. The combination of claim 11 further comprising a radar antenna within the enclosed chamber.

19. The combination of claim 11 further comprising a laser within the enclosed chamber.

20. A method for regulating the atmosphere surrounding the lenses of an optical telescope, the method comprising:
   (a) placing the telescope within the enclosed chamber of a combination comprising:
      (i) a base;
      (ii) a support structure;
      (iii) a first cylindrical section having side walls and upper and lower open ends, the first cylindrical section being vertically movable between a lowermost first cylindrical section position and an uppermost first cylindrical section position;
      (iv) a second cylindrical section having side walls and upper and lower open ends, the second cylindrical section being vertically movable between a lowermost second cylindrical section position and an uppermost second cylindrical section position, the second cylindrical section being disposed in telescope-like relationship with the first cylindrical section;
      (v) a cover disposed directly above the upper open ends of the first and second cylindrical sections;
      (vi) a driver for moving the first cylindrical section between the lowermost and uppermost first cylindrical section positions and for moving the second cylindrical section between the lowermost and uppermost second cylindrical section positions;
   wherein, when the first cylindrical section is disposed at the lowermost first cylindrical section position and the second cylindrical section is disposed at the uppermost second cylindrical section position, the base, the first cylindrical section, the second cylindrical section and the cover define an enclosed chamber;
   (b) raising the first cylindrical section above the lowermost first cylindrical section position and lowering the second cylindrical section below the uppermost second cylindrical section position to allow sufficient air to circulate from outside the enclosed chamber through the mirrors of the telescope to control the atmosphere surrounding the lenses of the telescope.

* * * * *